(12) United States Patent
Garms

(10) Patent No.: US 8,090,150 B2
(45) Date of Patent: Jan. 3, 2012

(54) METHOD AND SYSTEM FOR IDENTIFYING A CONTAINMENT VESSEL

(75) Inventor: Walter Irving Garms, Berkeley, CA (US)

(73) Assignee: Morpho Detection, Inc., Newark, CA (US)

( * ) Notice: Subject to any disclaimer, the term of this patent is extended or adjusted under 35 U.S.C. 154(b) by 728 days.

(21) Appl. No.: 12/249,057

(22) Filed: Oct. 10, 2008

(65) Prior Publication Data

US 2010/0092057 A1   Apr. 15, 2010

(51) Int. Cl.
*G06K 9/00* (2006.01)
*G01N 23/04* (2006.01)

(52) U.S. Cl. .......................... 382/103; 382/224; 378/57

(58) Field of Classification Search .................. 382/100, 382/103, 106, 107, 132, 141, 143, 154, 155, 382/168, 172, 173, 181, 193–195, 199, 219–224, 382/232, 254, 274, 276, 285–291, 305, 312; 324/637; 378/19, 57
See application file for complete search history.

(56) References Cited

U.S. PATENT DOCUMENTS

| | | | |
|---|---|---|---|
| 5,098,640 A | 3/1992 | Gozani et al. | |
| 5,905,806 A | 5/1999 | Eberhard et al. | |
| 6,075,871 A | 6/2000 | Simanovsky et al. | |
| 6,076,400 A | 6/2000 | Bechwati et al. | |
| 6,078,642 A | 6/2000 | Simanovsky et al. | |
| 6,088,423 A | 7/2000 | Krug et al. | |
| 6,195,444 B1 | 2/2001 | Simanovsky et al. | |
| 6,272,230 B1 | 8/2001 | Hiraoglu et al. | |
| RE37,899 E | 11/2002 | Grodzins et al. | |
| 6,556,653 B2 | 4/2003 | Hussein | |
| 7,277,577 B2 | 10/2007 | Ying et al. | |
| 7,333,589 B2 | 2/2008 | Ellenbogen et al. | |
| 7,356,174 B2 | 4/2008 | Leue et al. | |
| 7,366,282 B2 | 4/2008 | Peschmann | |
| 7,369,640 B2 | 5/2008 | Seppi et al. | |
| 7,440,544 B2 * | 10/2008 | Scheinman et al. | 378/57 |
| 7,474,786 B2 * | 1/2009 | Naidu et al. | 382/168 |
| 7,492,855 B2 | 2/2009 | Hopkins et al. | |
| 7,548,606 B2 * | 6/2009 | Skatter et al. | 378/57 |
| 7,579,845 B2 * | 8/2009 | Peschmann et al. | 324/637 |
| 7,596,275 B1 * | 9/2009 | Richardson et al. | 382/224 |
| 7,813,540 B1 * | 10/2010 | Kraft | 382/143 |
| 2009/0136089 A1 | 5/2009 | Singh | |

* cited by examiner

*Primary Examiner* — Seyed Azarian
(74) *Attorney, Agent, or Firm* — Armstrong Teasdale LLP

(57) ABSTRACT

A method and system for identifying an object in an acquired image. The method includes detecting an object within the acquired image, and determining whether the detected object is a containment vessel. If the object is not a containment vessel, the method includes applying a first set of rules for classifying the object. If the object is a containment vessel, the method includes applying a second set of rules for classifying the object.

18 Claims, 12 Drawing Sheets

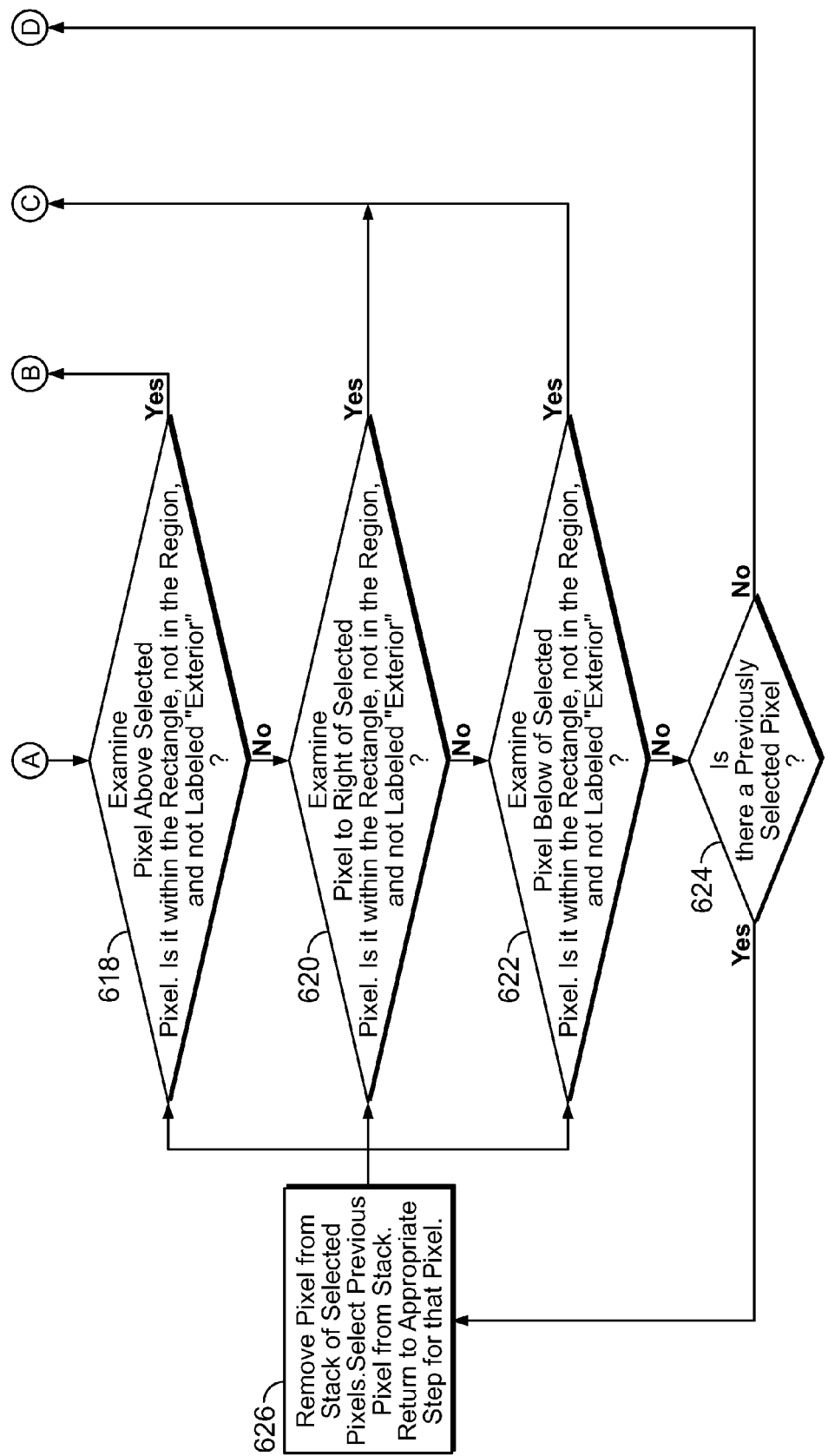

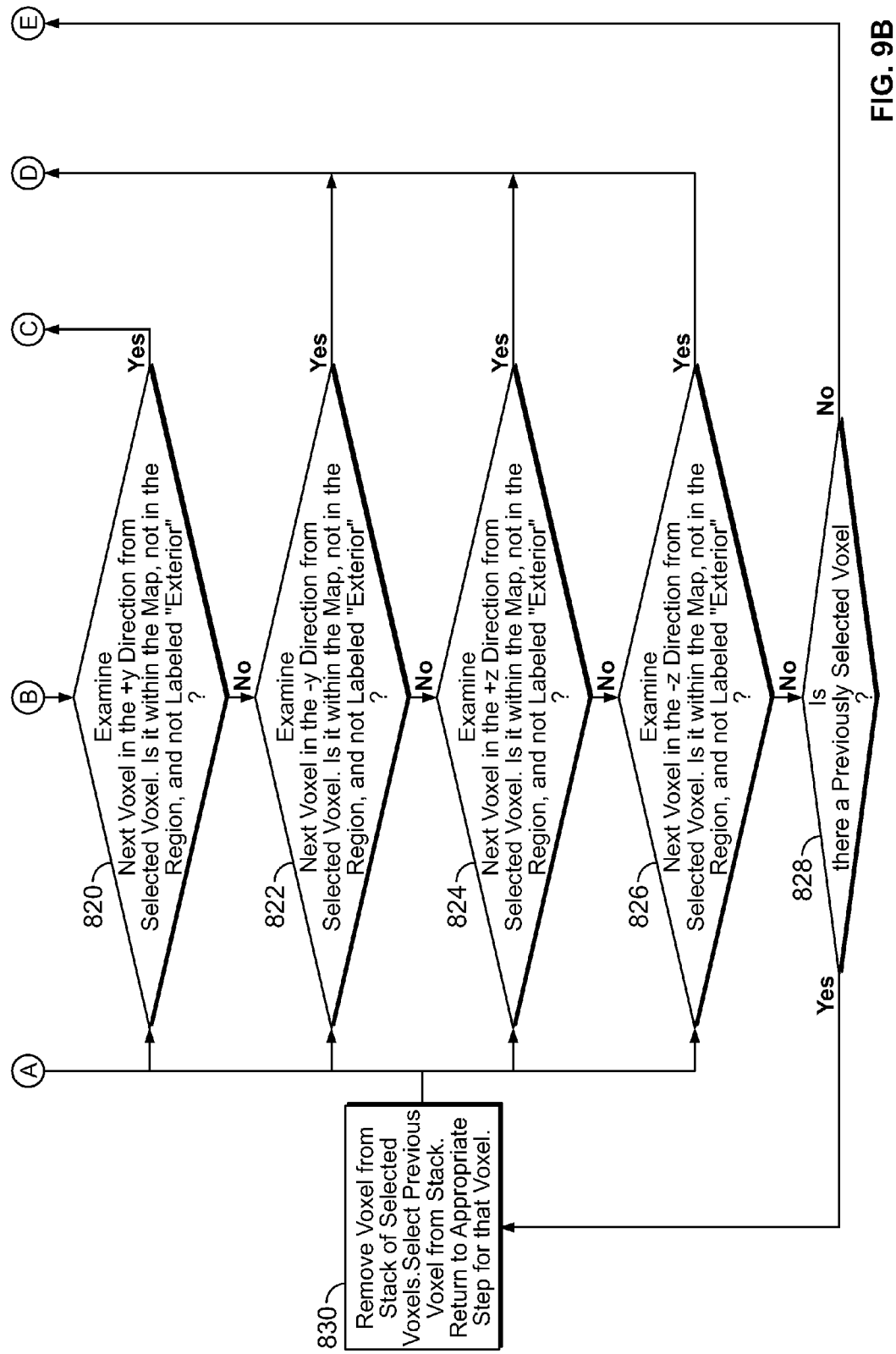

METHOD AND SYSTEM FOR IDENTIFYING A CONTAINMENT VESSEL

FIELD OF THE INVENTION

The embodiments described herein relate generally to identifying a characteristic of an object and, more particularly, to identifying a characteristic of an object within a container to facilitate detecting contraband concealed within the container.

BACKGROUND OF THE INVENTION

It is known to use computed tomography (CT) based explosive detection systems (EDS) to detect the presence of contraband. As used herein, the term "contraband" refers to any goods, such as an object and/or a material, that are unauthorized to possess, including, but not limited to including, explosives, weapons, drugs, and/or controlled substances. In the embodiments described herein and in the known EDS discussed herein, contraband is contained within a container, such as, but not limited to, a cargo container, a bag, a box, baggage, luggage, a carton, a crate, and/or any other suitable receptacle.

At least some known EDS CT systems acquire a number of two-dimensional (2D) image slices through a container, and analyze each 2D image slice. As is known, each 2D image slice is formed from a rectangular array of picture elements, or pixels. The numeric value of each pixel represents a CT number, which is an estimate of density. As used herein, a CT number is used as an estimate of density of a material, although the CT number is an indication of an attenuation coefficient of the material rather than being a measure of the density of the material. In at least some known analysis methods, the analysis of each image slice includes segmenting, or grouping together, contiguous pixels into regions. Regions within the different 2D image slices are then compared and grouped into image objects representing physical objects within the container. In at least one known 2D image analysis method, there are only a few 2D image slices, and as little as one 2D image slice, through each physical object, making a determination of the presence of a contained volume within the physical object substantially impossible and/or impractical. Accordingly, there is a need for an image analysis method that determines whether a region completely surrounds an area within an image to indicate the presence of a contained volume within an object.

At least some other known EDS CT systems generate full volume data, which includes a large number of cross-sectional 2D image slices. The 2D image slices are generally evenly and closely spaced such that an entire volume of the container is represented. As is known, the volume is represented in the volume data by volume elements, or voxels. The numeric value of each voxel is a CT number. Similar to the 2D image analysis method, during at least one known three-dimensional (3D) image analysis of the volume data, contiguous voxels with a similar CT number are grouped together into image objects that represent characteristics, such as a size, a shape, and an approximate density, of a physical object within the container. Rules are applied to the measurements of the image object, such as a density, a volume, a mass, and/or a shape, to determine if the physical object is contraband and/or another item of interest.

To perform at least some known image analysis methods for the detection of explosives, it is assumed that explosives generally have a characteristic density that often enables explosives to be identified by mass and density. Some such explosives are referred to herein as "standard density explosives." At least some known benign objects have substantially the same mass and the same density as standard density explosives, so at least some known EDSs will generate an alarm on such benign objects. An alarm on a benign object is called a "false alarm." Performing an examination for each false alarm may cost time and/or money because at least one known examination is performed on the object by opening a container containing the object and/or by using alternate technologies. In at least some known EDSs, there are a reasonably low number of such types of false alarms because there are only a limited number of benign objects, which may be included in passenger baggage, that have the substantially the same density as an explosive.

However, at least some known explosives, such as powders, are less dense than other known explosives, such as standard density explosives. Such less dense explosives are referred to herein as "low-density explosives." A need exists for an analysis method that can analyze standard density explosives and low-density explosives to facilitate decreasing a number of false alarms and/or determine if a low-density explosive is contained within a containment vessel.

Further, if an area of a CT image slice is surrounded by a dense material, the CT numbers of the contained area may be inaccurate for various reasons, causing the CT number to generally be higher than if the contained area were not surrounded by a dense material. As such, the measured CT number of some higher density contraband, such as explosives, that is contained in a dense containment vessel may be higher than if the higher density contraband were not in a dense containment vessel. As referred to herein, a "dense containment vessel" is any containment vessel of sufficient density to cause inaccuracies in determining the density of a material within the containment vessel. An example of a dense containment vessel is a metal pipe, such as a steel pipe, a nickel pipe, an iron pipe, a copper pipe, and/or a bronze pipe, a metal container, and/or any other container formed from a relatively high density material. In at least some known EDS CT systems, the higher measured CT number may be higher than the CT number threshold set for contraband, and therefore an alarm may not be generated. However, if a higher threshold is applied to all objects in the container, the false alarm rate would increase. Accordingly, there is a need to determine whether contraband is contained within a dense containment vessel.

BRIEF DESCRIPTION OF THE INVENTION

In one aspect, a method for identifying an object in an acquired image is provided. The method includes detecting an object within the acquired image, and determining whether the detected object is a containment vessel. If the object is not a containment vessel, the method includes applying a first set of rules for classifying the object. If the object is a containment vessel, the method includes applying a second set of rules for classifying the object.

In another aspect, a system for identifying an object is provided. The system includes a radiation source, a detector for detecting radiation generated by the radiation source, and a control system coupled in communication with the radiation source and the detector. The control system is configured to detect an object within the acquired image, and determine whether the detected object is a containment vessel. If the object is not a containment vessel, the control system is configured to apply a first set of rules for classifying the object. If the object is a containment vessel, the control system is configured to apply a second set of rules for classifying the object. The control system is further configured to output information relating to the object.

In still another aspect, a computer program embodied on a computer-readable medium is provided. The computer program includes a code segment that configures a processor to detect an object within an acquired image, and determine whether the detected object is a containment vessel. If the object is not a containment vessel, the code segment configures the processor to apply a first set of rules for classifying the object if the object is not the containment vessel. If the object is a containment vessel, the code segment configures the processor to apply a second set of rules for classifying the object. The code segment further configures the processor to output information relating to the object.

The embodiments described herein facilitate determining whether a region completely surrounds an area within an image such that the surrounded area can be analyzed differently than the un-surrounded area. Further, if a containment vessel is determined to be a dense containment vessel, the embodiments described herein compensate for inaccuracies in a CT number of the contained area.

BRIEF DESCRIPTION OF THE DRAWINGS

FIGS. 1, 2, 3A, 3B, 4, 5, 6, 7, 8, and 9 show exemplary embodiments of the systems and methods described herein.

FIG. 1 is a schematic illustration of a computed tomography (CT) scanning system.

FIG. 2 is a block diagram of the CT scanning system shown in FIG. 1.

FIG. 3A is a flowchart of an exemplary embodiment of a first portion of a method for detecting contraband that may be used with the CT scanning system shown in FIG. 1.

FIG. 3B is a flowchart of an exemplary embodiment of a second portion of the method for detecting contraband that may be used with the CT scanning system shown in FIG. 1.

FIG. 4 is a flowchart of an exemplary embodiment of a method for applying a second set of rules that may be used with the method shown in FIGS. 3A and 3B.

FIG. 5 is a flowchart of an exemplary embodiment of a method for detecting a containment vessel that may be used with the method shown in FIGS. 3A and 3B.

FIG. 6 is graphical flowchart of a pair of exemplary images undergoing the method shown in FIG. 5.

FIGS. 7A and 7B are a flowchart of an exemplary embodiment of a method for boundary detection that may be used with the method shown in FIG. 5.

FIG. 8 is a flowchart of an alternative embodiment of a method for detecting a containment vessel that may be used with the method shown in FIGS. 3A and 3B.

FIGS. 9A and 9B are a flowchart of an exemplary embodiment of a method for boundary detection that may be used with the method shown in FIG. 8.

DETAILED DESCRIPTION OF THE INVENTION

Figure 1:
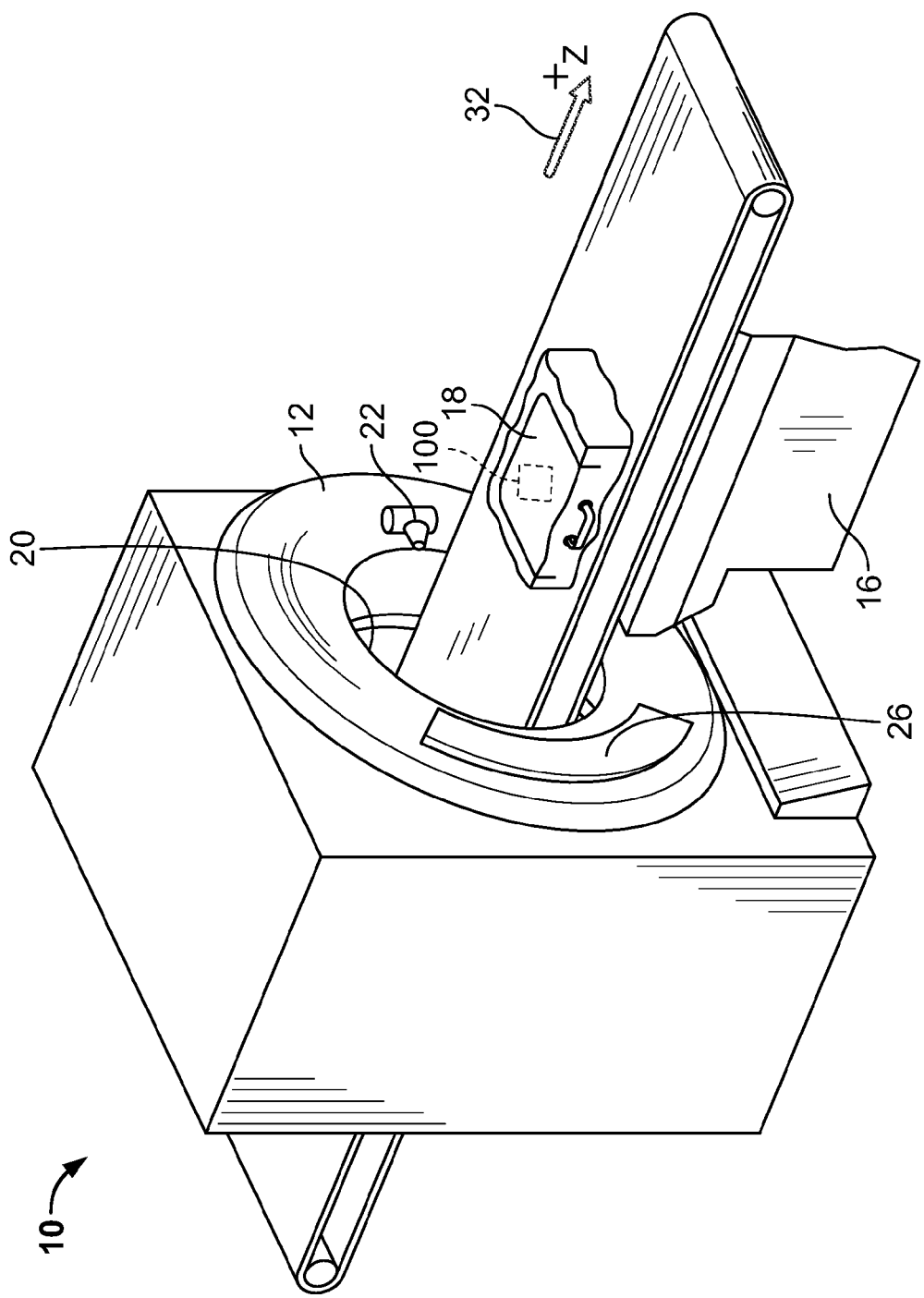

Embodiments of the systems and methods described herein may use, for example, a lower density threshold, or lower mass threshold, for a volume that is inside a containment vessel, as compared to a density threshold, or a mass threshold, that is used for all other objects within the containment vessel. Accordingly, the embodiments described herein may detect low-density explosives without substantially increasing a false alarm rate. More specifically, the embodiments described herein may facilitate increasing a ratio of detection rate to false alarm rate.

Further, the embodiments described herein determine whether at least one dense containment vessel is present within a container. By knowing that a material may be within the dense containment vessel, the methods described herein can automatically apply a higher CT number threshold within the dense containment vessel than the CT number threshold used for material outside the dense containment vessel. As such, the methods and systems described herein facilitate producing an alarm on contraband within the dense containment vessel without substantially increasing a false alarm rate. Moreover, in cases in which the containment vessel is large and dense enough that the CT numbers on the inside of the containment vessel are entirely unreliable such that contraband is "shielded" within the containment vessel, the system and methods described herein produce an alarm on the shielding object itself. The method described herein can be repeated for each containment vessel detected within the container.

Additionally, the embodiments described herein provide systems and methods for processing the output of an imaging system that includes a detection and/or classification component for determining whether a containment vessel is present for applying a special set of rules for the containment vessel. In one embodiment, a detection system receives images from an imaging system. Using image elements making up the images, the detection system detects a containment vessel. Image elements within an interior region of the containment vessel may be corrected and further processed to determine if explosives, narcotics, weapons, and/or other contraband is present within the containment vessel. As used herein, the term "image element" refers to an element within an image, such as a pixel and/or a voxel.

A technical effect of the systems and methods described herein is to reduce the occurrence of false alarms by analyzing a first type of object using a first set of rules and analyzing a second type of object using a second set of rules. As used herein, the term "set of rules" refers to rules, which are based on characteristics of acquired images of the container, that are used to detect and/or classify physical objects within the container. For example, rules may include thresholds, texture measurements, and/or thickness measurements that are used to classify and/or detect a physical object within the container based on an image object representing the physical object. An exemplary embodiment of a method applies the first set of rules to contents of a container and the second set of rules to a material within a containment vessel within the container. In one embodiment, a detection algorithm determines a first set of image elements belonging to a containment vessel and a second set of image elements belonging to an exterior of the containment vessel. If a containment vessel is determined to be present, the detection algorithm determines whether there is a third set of image elements within an interior of the containment vessel. The interior image elements are analyzed using the second set of rules.

Embodiments of the systems and methods described herein may be used to facilitate avoiding misidentification associated with low-density materials, such as identifying as contraband explosive powders not sufficiently contained to be harmful, by discriminating between contained and uncontained low-density contraband. As such, the embodiments herein facilitate reducing a number of false positives. Further, because a second set of rules is applied to the material, such as the powder, within a containment vessel, inaccuracies in the density of the interior material, such as inaccuracies caused by the interference and/or shielding of the containment vessel, are compensated for to facilitate reducing a number of false negatives.

At least one embodiment of the present invention is described below in reference to its application in connection with and operation of a system for inspecting baggage. However, it should be apparent to those skilled in the art and guided by the teachings herein provided that the invention is likewise applicable to any suitable system for scanning containers including, without limitation, cargo containers, crates, boxes, drums, containers, luggage, and suitcases, transported by water, land, and/or air, as well as other containers and/or objects.

Moreover, although the embodiments described below are in reference to an application in connection with and operation of a system incorporating an X-ray computed tomography (CT) scanning system for inspecting baggage, it should apparent to those skilled in the art and guided by the teachings herein provided that any suitable radiation source including, without limitation, neutrons or gamma rays, may be used in alternative embodiments. Further, it should be apparent to those skilled in the art and guided by the teachings herein provided that any scanning system may be used that produces a sufficient number of pixels and/or voxels to enable the functionality of the detection system described herein. For example, the system and methods described may be used for detection of containment vessels in volumetric data in any other suitable application, such as, but not limited to, medical imaging.

Figure 2:
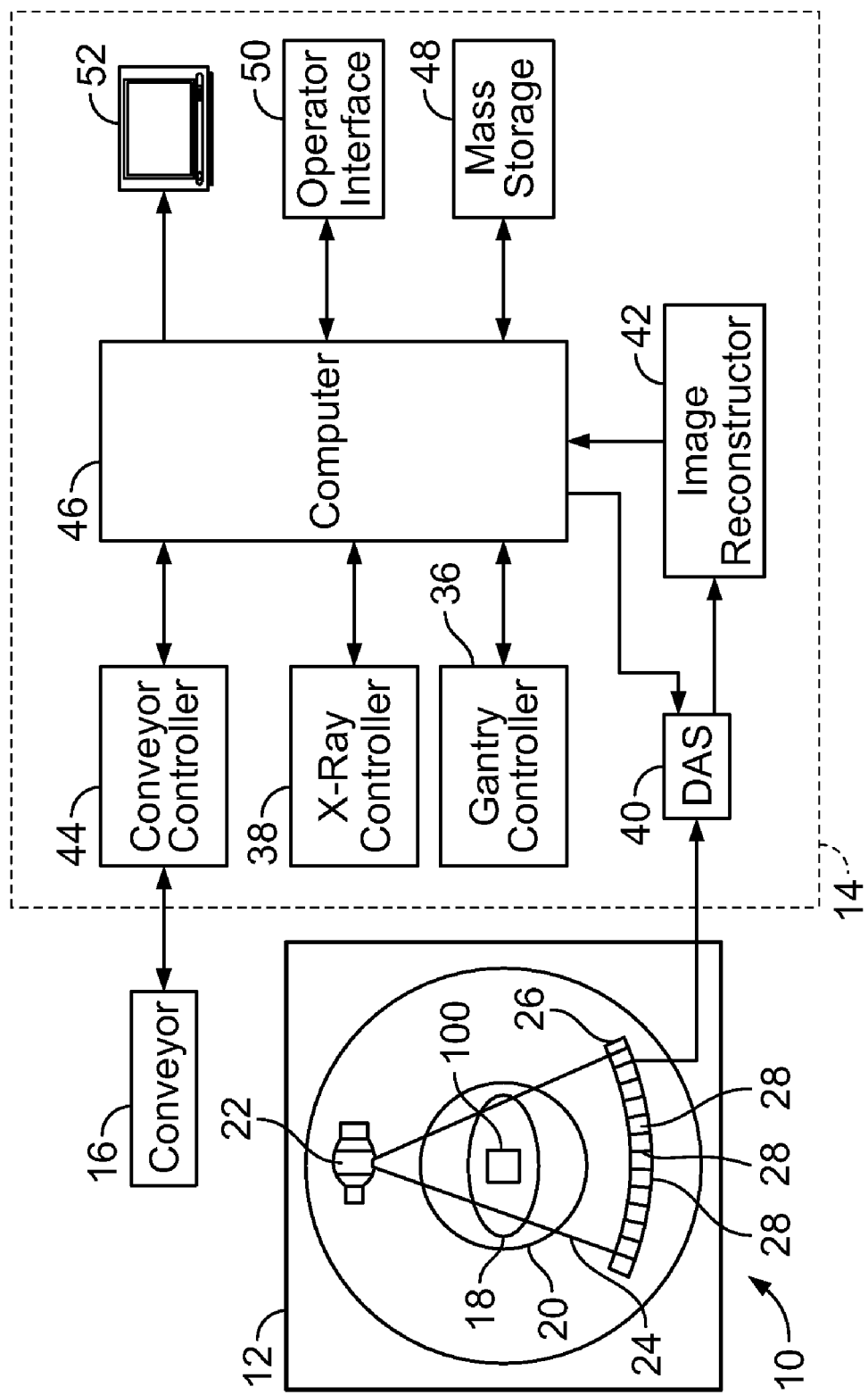

FIG. 1 is a schematic illustration of a computed tomography (CT) scanning system 10. FIG. 2 is a block diagram of CT scanning system 10. CT scanning system 10 includes a gantry 12, a control system 14, and a motorized conveyor belt 16 for positioning a container 18, such as a piece of luggage, in a gantry opening 20 defined through gantry 12. Gantry 12 includes an X-ray source 22 that projects a fan beam of X-rays 24 toward a detector array 26 opposing X-ray source 22 and coupled to gantry 12. X-ray source 22 is a radiation source and generates radiation, such as X-ray radiation. Detector array 26 is a detector and is formed by detector elements 28 that each detect radiation and produce a signal having a magnitude that represents, and is dependent on, the intensity of the attenuated X-ray beam after it has passed through container 18 being imaged. During a helical scan that acquires X-ray projection data, gantry 12 rotates X-ray source 22 and detector array 26 within a plane and about a center of rotation 30 of gantry 12. While gantry 12 is rotating, container 18 is transported through gantry 12 in a Z-direction 32 that is perpendicular to the plane of rotation. In the exemplary embodiment, detector array 26 includes a plurality of detector rings each having a plurality of detector elements 28. Such detector rings having an angular configuration corresponding to X-ray source 22.

Gantry 12 and X-ray source 22 are controlled by control system 14. Control system 14 includes a gantry controller 36, an X-ray controller 38, a data acquisition system (DAS) 40, an image reconstructor 42, a conveyor controller 44, a computer 46, a mass storage-system 48, an operator interface 50, and a display device 52. Gantry controller 36 controls a rotational speed and position of gantry 12, and X-ray controller 38 provides power and timing signals to X-ray source 22. DAS 40 acquires analog data from detector elements 28 and converts the analog data to digital data for subsequent processing. Image reconstructor 42 receives the digitized X-ray data from DAS 40 and performs an image reconstruction process, including filtering the projection data using a helical reconstruction algorithm.

Computer 46 communicates with gantry controller 36, X-ray controller 38, and conveyor controller 44. More specifically, computer 46 transmits control signals to controllers 36, 38, and/or 44 and receives information from controllers 36, 38, and/or 44. Computer 46 is configured to provide commands and operational parameters to DAS 40 and to receive reconstructed image data from image reconstructor 42. The reconstructed image data is stored by computer 46 in mass-storage system 48 for subsequent retrieval. An operator interfaces with computer 46 through operator interface 50 that includes, but is not limited to including, a keyboard and a graphical pointing device. The operator receives output, such as the reconstructed image, control settings, and/or any other suitable information, on display device 52.

Operable communication between the various system elements shown in FIG. 2 is depicted by arrowhead lines that illustrate a path for signal communication and/or mechanical operation, depending on the system element involved. Operable communication amongst and/or between the system elements may is performed through a hardwired or a wireless network. Computer 46 can be a standalone computer or a network computer and can include instructions in a variety of computer languages for use on a variety of computer platforms, such as PC, Apple and/or Sun Microsystems, and under a variety of operating systems, such as Window, MacOS, Unix, an/or any other suitable operating system. Other examples of computer 46 include, but are not limited to, a system having a microprocessor, a microcontroller, and/or any other suitable processing device capable of executing commands of computer readable data and/or a program for executing a control algorithm. In order to perform the methods described herein, as well as the computations therefore, such as the execution of Fourier analysis algorithm(s), and/or control processes described herein, any of the controllers described herein can include, but not be limited to including, a processor(s), computer(s), memory, storage, register(s), timing, interrupt(s), communication interfaces, and/or input/output signal interfaces. For example, a controller includes input signal filtering to enable accurate sampling and conversion and/or acquisitions of such signals from communications interfaces. As described above, the embodiments described herein can be implemented through computer-implemented processes and apparatuses for practicing those processes.

In operation, CT scanning system 10 acquires image data of container 18 by generating fan beam of X-rays 24 using X-ray source 22, transmitting fan beam of X-rays 24 through container 18, and receiving fan beam of X-rays 24 at detector array 26 after the X-rays have been attenuated by container 18. More specifically, in the exemplary embodiment, CT scanning system 10 acquires image data of an object 100 within container 18 be receiving attenuated X-rays. Control system 14 receives data of the attenuated X-rays, as described above, and processes the received data as described herein. In the exemplary embodiment, control system 14 performs methods 200, 300, 400, 600, 700, and/or 800, as described in more detail below.

Figure 3A:
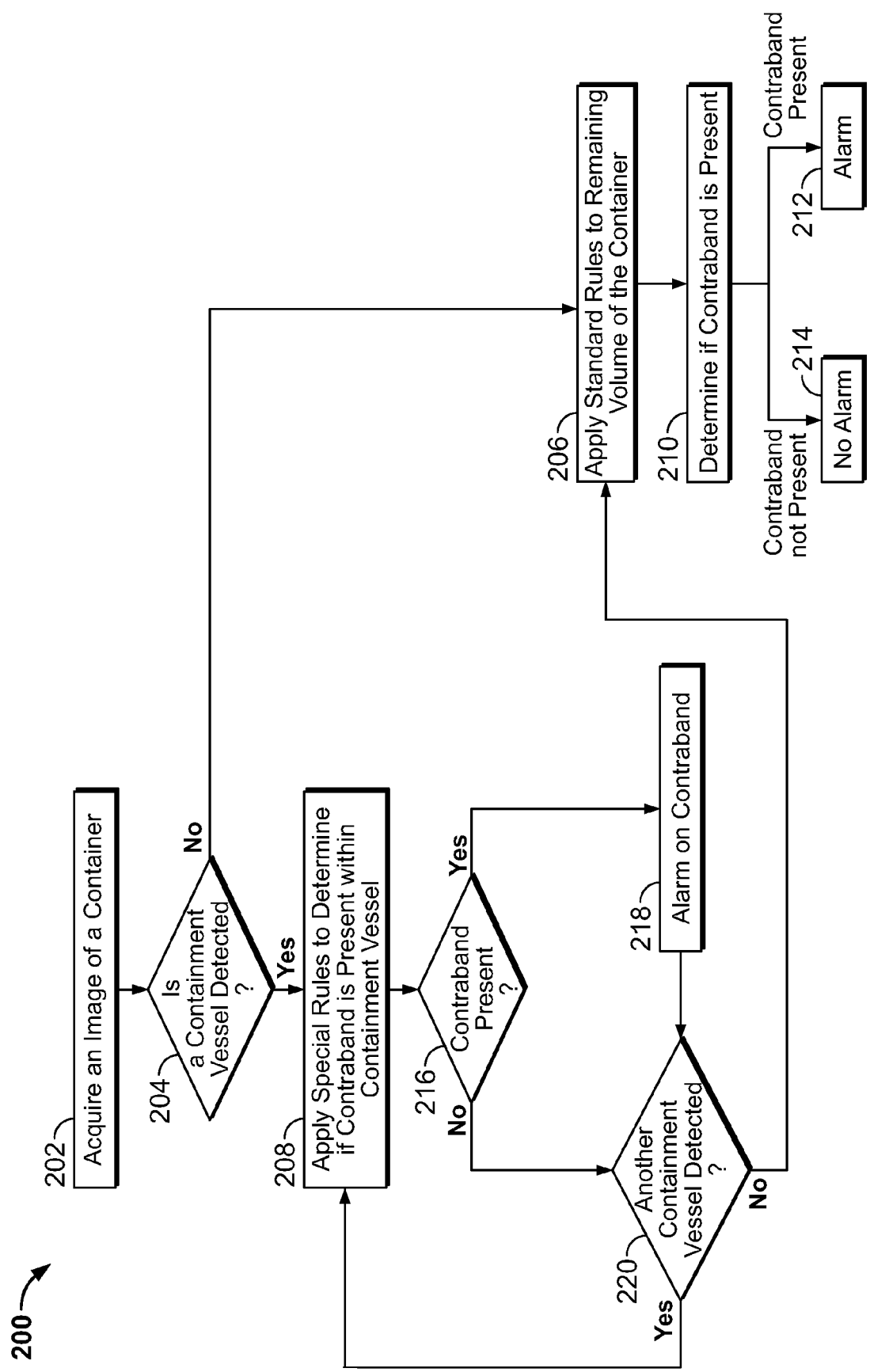
Figure 3B:
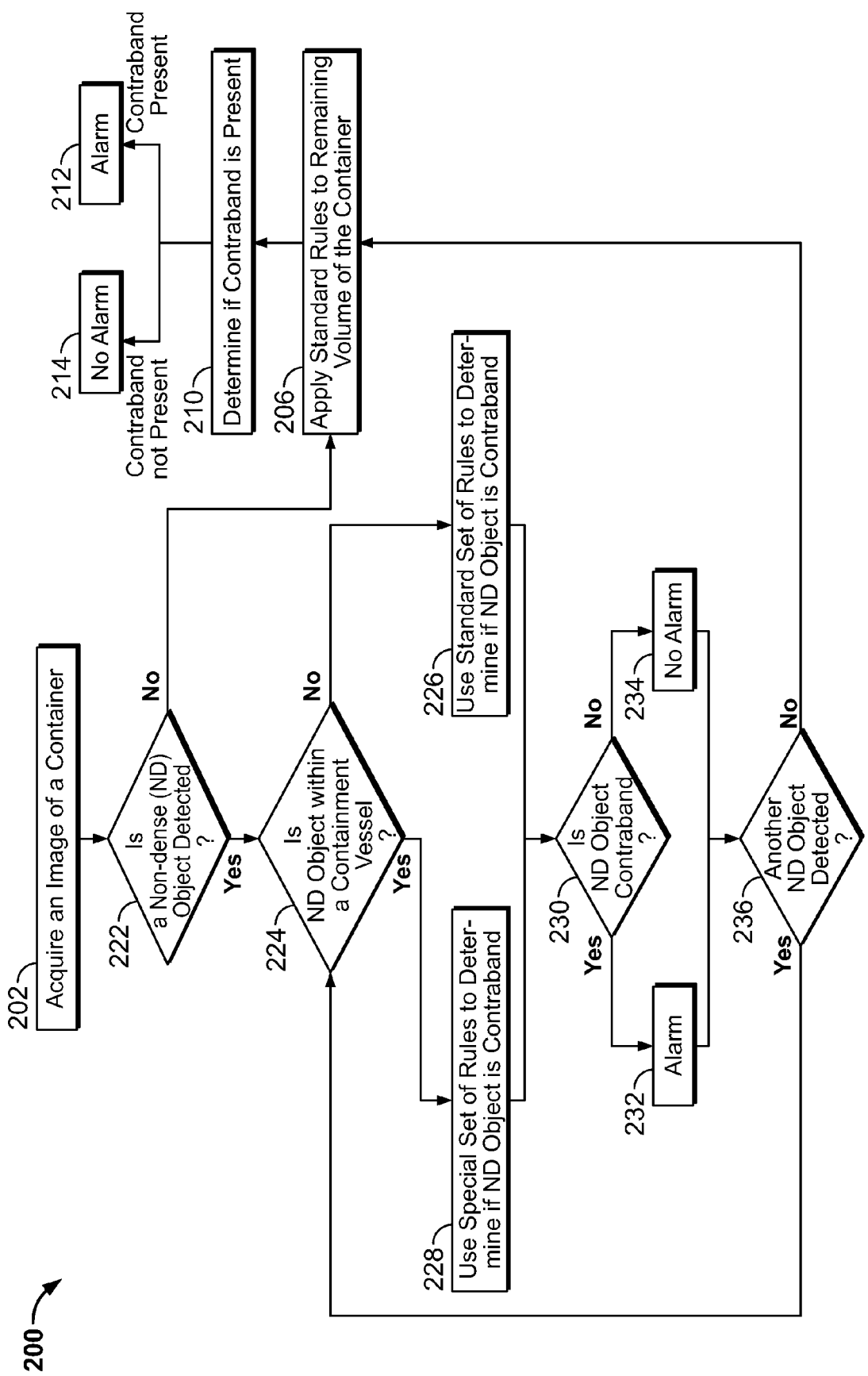

FIGS. 3A and 3B are flowcharts of an exemplary embodiment of a method 200 for detecting contraband that may be used with CT scanning system 10 (shown in FIG. 1). More specifically, FIG. 3A shows a flowchart illustrating a portion of method 200 for identifying and/or classifying object 100 (shown in FIG. 1) when a containment vessel is detected, and FIG. 3B shows a flowchart illustrating another portion of method 200 for identifying and/or classifying object 100 when a non-dense material is detected. As used herein, the term "dense" refers to a material having a density that is greater than approximately 2500 mg/cc, and the term "non-dense" refers to a material having a density that is less than approximately 2000 mg/cc. The terms "non-dense" and low-density" are used interchangeable herein to indicate a material having a density of less than approximately 2000 mg/cc. In the exemplary embodiment, method 200 includes performing both portions of method 200 in parallel. Alternatively, the portions of method 200 may be performed serially.

Further, in the exemplary embodiment, method 200 identifies and/or classifies objects, such as object 100, as contraband or a benign object. Method 200 includes a "rules algorithm" and/or an "identification algorithm." In the exemplary embodiment, method 200 is implemented on CT scanning system 10, however, method 200 is not limited to implementation on CT scanning system 10. Rather, method 200 may be embodied on a computer readable medium as a computer program and/or implemented and/or embodied by any other suitable means. The computer program may include a code segment that, when executed by a processor, configures the processor to perform one or more of the functions of method 200. Further, method 200 may also be used with pixels, voxels, and/or any suitable image element. Moreover, when more than one object 100 is present within a container, method 200 can be performed for each object 100 within the container.

A 2D image and/or a 3D image is acquired 202 of a container, such as container 182 (shown in FIG. 1) using CT scanning system 10. More specifically, in the exemplary embodiment, the image is acquired 202 at a single energy level and the image is used for detecting the presence of a containment vessel and for determining the type of material of the containment vessel. Alternatively, CT scanning system 10 uses at least two different energies to acquire a first image and a second image. When dual energy is used, a first scan is performed at a higher energy and a second scan is performed at a lower energy level. The first image is used to detect the presence of a containment vessel and/or the density of the containment vessel, and the second image, combined with the first image, is used to determine the type of material. For example, the first image and the second image are used to determine the atomic number of a material comprising the containment vessel. As such, using dual energy to acquire image data of the container, the material of the containment vessel can more accurately be determined. Further, when dual energy is used, the second image is used to clear alarms other than containment vessel alarms. Although it will be understood that dual energy can be used to acquire 202 images of the container, the exemplary embodiment described herein uses a single energy to acquire 202 the original image of the container.

In the exemplary embodiment, when method 200 includes using the acquired image to detect 204 a containment vessel within a container. The containment vessel may be detected using any suitable method for detecting a containment vessel, such as the methods 400 and/or 700 as described herein and shown in FIGS. 5 and 8. If a containment vessel is not detected 204, a first set of rules is applied 206 to determine the presence of contraband within the container. If a containment vessel is detected 204, a second set of rules is applied 208 to classify the containment vessel and/or a material within the containment vessel as contraband and/or allowed contents. The first set of rules includes the "standard set of rules" and/or the "standard rules" because the first set of rules is the set of rules used for generally classifying and/or detecting objects within the container. The second set of rules includes the "special set of rules" and/or the "special rules" because the second set of rules is the set of rules used for classifying and/or detecting objects within the container in the special case when a containment vessel is detected within the container. The second set of rules is any suitable set of rules, different from the first set of rules, that is used to detect the presence of contraband when a containment vessel is detected within the container. For example, the second set of rules is applied 208 using method 300 (shown in FIG. 4). In the exemplary embodiment, the sets of rules described herein use thresholds to analyze an object and/or containment vessel.

In the exemplary embodiment, if application 206 of the first set of rules determines 210 that contraband is present within the container, an alarm is indicated 212. An alarm may be any suitable indication for alerting personnel and/or CT scanning system 10 to the presence of contraband within the container. For example, the alarm may be an audio indication, a visual indication, and/or an electronic signal indication. In the exemplary embodiment, the alarm is considered to be an output of information related to an object within the container, however, any other suitable information related to the object may also be output by CT scanning system 10. Further, in the exemplary embodiment, if application 206 of the first set of rules determines 210 that contraband is not present within the container, an alarm is not indicated 214 because the object is a benign object. Similarly, if application 208 of the second set of rules determines 216 that contraband is present within the container, an alarm is indicated 218. If application 208 of the second set of rules determines 216 that contraband is not present within the container, method 200 determines 220 whether another containment vessel has been detected within the container. Similarly, when the alarm is indicated 218, method determines 220 whether another containment vessel has been detected within the container. If another containment vessel has not been detected, the remainder of the container is analyzed by applying 206 the first set of rules. If another containment vessel has been detected, another containment vessel is analyzing using steps 208, 216, 218, and/or 220.

Further, after the image of the container is acquired 202, in the exemplary embodiment, method 200 includes using the acquired image to detect 222 a non-dense material, such as a low-density explosive powder. A "powder" is referred to herein for an example of a non-dense material, but it will be understood that any non-dense material may be detected and/or classified as described herein. If a non-dense material is not detected 222 within the container, the contents of the container are classified by applying 206 the first set of rules to determine whether the container contains contraband and to classify the contents as contraband and/or allowed contents. In the exemplary embodiment, the first set of rules is selected such that an alarm is not indicated for non-dense material that is not within a containment vessel. If application 206 of the first set of rules determines 210 that contraband is present within the container, an alarm is indicated 212. If application 206 of the first set of rules determines 210 that contraband is not present within the container, an alarm is not indicated 214 because the object is a benign object.

Referring to FIG. 3B, if a non-dense material is detected 222, method 200 detects 224 whether the non-dense material is contained within a containment vessel. The containment vessel may be detected using any suitable method for detecting a containment vessel, such as the methods 400 and/or 700 as described herein and shown in FIGS. 5 and 8. In the exemplary embodiment, to determine 224 if an object is within the containment vessel, a set of object rules includes rules to create an object and rules to determine whether to classify the object as potential contraband. As used herein, an "object" is an object within a containment vessel. For example, when using thresholds to create the object, the rules group a set of contiguous image elements, such as a pixel, that have CT values within two thresholds, such as $T_{low} \leq ctvalue \leq T_{high}$. Such rules may additionally, or alternatively, group a set of contiguous image elements, such as voxels, that have differences in values, as compared to a neighboring image element, that are less than a threshold, such as $|Vox1-Vox2|<T_{diff}$. An example rules that classify whether an object is potentially contraband are rules that determines if an estimated density is between two thresholds, such as $D_{low1} \leq$ estimated density $\leq D_{high1}$, and the mass is greater than a mass threshold $M_1$. When there is more than one target density range and a different mass for each range, a second set of thresholds, such as $D_{lowN} \leq$ estimated density $\leq D_{highN}$, and estimated mass $\geq M_N$, wherein N is the number of target density ranges. Alternative rules include rules using a texture measure, such as granularity or uniformity of image elements, and/or a thickness measurement.

If the non-dense material is not within a containment vessel, the first set of rules is applied 226 to classify the non-dense material as contraband and/or allowed contents. If the non-dense material is contained within a containment vessel, the second set of rules is applied 228 to classify the non-dense material as contraband and/or allowed contents. More specifically, when either set of rules determines 230 that the non-dense material is contraband, an alarm is indicated 232. When either set of rules determines 230 that the non-dense material is not contraband, no alarm is indicated 234. After alarming 232 or not alarming 234, method 200 includes determining 236 whether another non-dense material has been detected. If another non-dense material has not been detected, the remainder of the container is analyzed by applying 206 the first set of rules. If another non-dense material has been detected, another non-dense material is analyzing using steps 224, 226, 228, 230, 232, 234, and/or 236.

Figure 4:
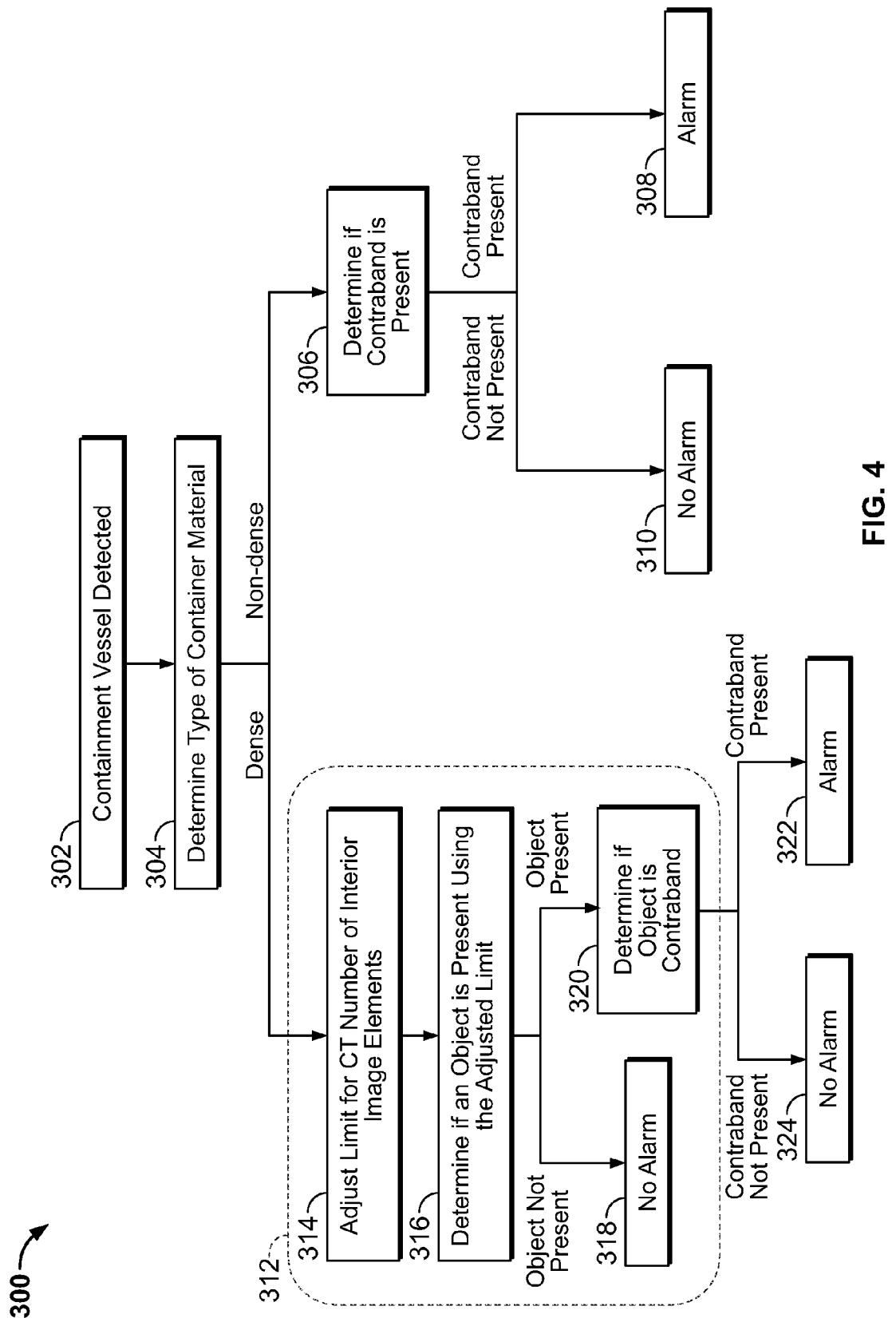

FIG. 4 is a flowchart of an exemplary embodiment of a method 300 for applying a second set of rules that may be used with method 200 (shown in FIGS. 3A and 3B). Method 300 is also referred to as the "second set of rules," "special set or rules," and/or "special rules." Method 300 is performed after a containment vessel has been detected 302 in an acquired image using for example, method 400 (shown in FIG. 5) and/or method 700 (shown in FIG. 8). More specifically, if a containment vessel, with or without a powder therein, is detected 302, the type of material the containment vessel includes is determined 304. In the exemplary embodiment, the type of material is determined 304 using any suitable method for determining a material from an image of an object. Method 300 includes determining 304 if the material is a non-dense material such that the containment vessel is not a dense containment vessel but may be a contraband material. Alternatively, classifications other than "dense" and "non-dense" may be used to determine 304 a type of material.

In the exemplary embodiment, it is determined 306 whether the non-dense containment vessel is and/or includes contraband by, for example, comparing the density of the non-dense material with densities of known contraband materials. Examples of a non-dense material that method 300 may determine 306 are contraband and/or may include contraband therein are plastic explosives, Polyvinyl Chloride ("PVC"), glass, narcotics, and/or any other illicit and/or illegal material that is not dense but may form and/or be contained in at least a portion of a containment vessel. If contraband is determined 306 to be present, an alarm is indicated 308 to signal that the non-dense containment vessel includes a contraband material. If it is determined 306 that no contraband is present, no alarm is indicated 310. As such, method 300 classifies the non-dense material as being and/or including contraband or as not being and/or including contraband.

Method 300 includes determining 312 if the material is a dense material such that the containment vessel is a dense containment vessel. It is determined 312 whether the dense containment vessel includes contraband by, for example, comparing the density of the non-dense material with densities of known contraband materials. In the exemplary embodiment, the presence of contraband is determined 312 by adjusting 314 a CT number threshold from, for example, the value of a CT number threshold used in the first set of rules or the standard CT number threshold, to a higher CT number threshold to account for inaccuracies that may be caused by the dense containment vessel. As used herein, the CT number indicates an estimate of the density of a material. Alternatively, any other suitable threshold, limit, and/or characteristic within the first set of rules may be adjusted to account for effects of the dense containment vessel. In the exemplary embodiment, image elements are analyzed using the adjusted threshold to determine 316 if the object within the containment vessel is present, as described above with respect to FIG. 3B.

If an object is not present, no alarm is indicated 318. If it is determined 316 that an object is present, method 300 includes determining 320 if the object is and/or includes contraband. If the object is determined 320 to be and/or include contraband, an alarm is indicated 322 to signal that the dense containment vessel includes and/or is contraband. If it is determined 320 that the object is not and/or does not include contraband, no alarm is indicated 324. As such, method 300 classifies the dense material as being and/or including contraband or as not being and/or including contraband.

Figure 5:
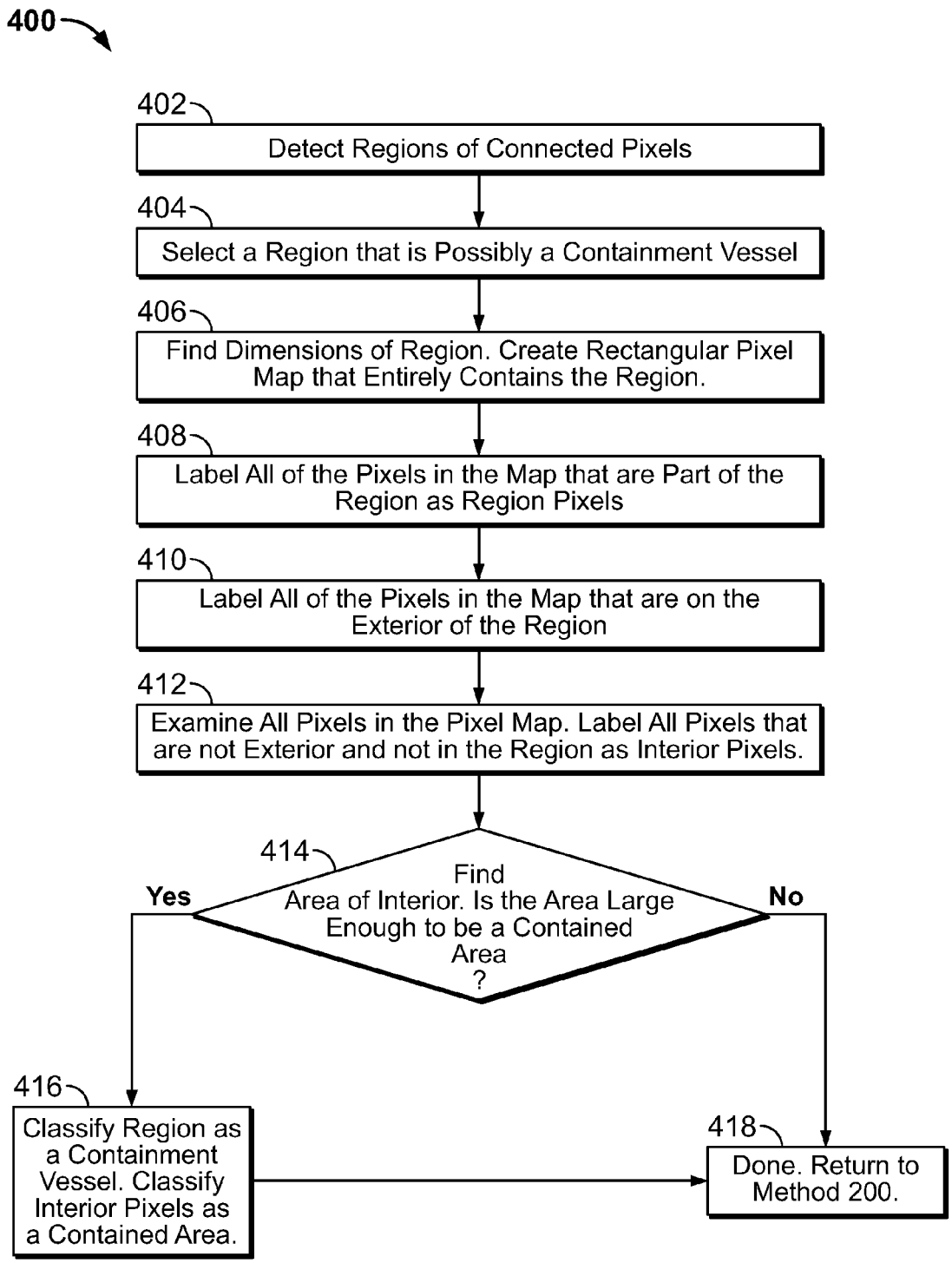

FIG. 5 is a flowchart of an exemplary embodiment of a method 400 for detecting a containment vessel that may be used with method 200 (shown in FIGS. 3A and 3B) and/or method 300 (shown in FIG. 4) and the acquired image. Method 400 is an example of a "detection algorithm." In the exemplary embodiment, a 2D image slice from the acquired image is processed using method 400. When a 3D image volume from the acquired image is processed, method 700 (shown in FIG. 8) is used, as described in more detail below.

Figure 6:
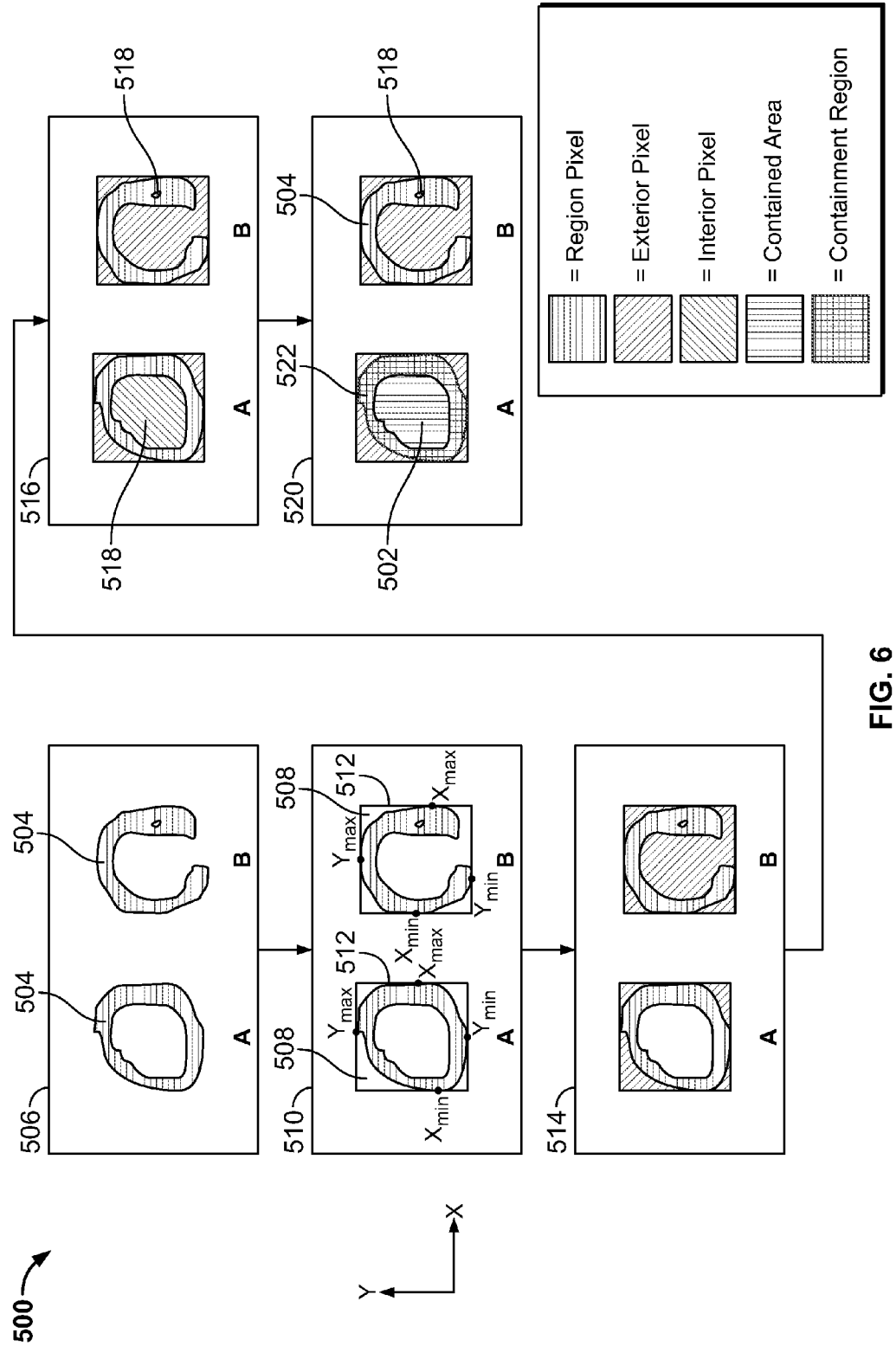

FIG. 6 is graphical flowchart 500 of a pair of exemplary 2D images A and B undergoing method 400. More specifically, a first image A and a second image B are illustrated in FIG. 5 as images A and B are modified by method 400. It the exemplary embodiment, image A includes a containment vessel and a contained region, and image B does not include a containment vessel or a contained region. Because images A and B are similar except for the containment vessel and contained region, like components are referred to with like reference numbers. Method 400 is described below in reference to FIGS. 5 and 6.

Method 400 detects a contained area in a 2D image slice A and/or B. Other methods may be used to detect a contained area, such as contained area 502, however, method 400 is an exemplary method for detecting a contained area. Method 400 includes detecting 402 at least one region 504 of connected pixels within the image slice. As used herein, the term "region" refers a set of contiguous pixels that have been determined to be part of one object. Region 504 may be detected 402 by grouping pixels that have, for example, a similar CT value. Each region 504 in which an estimated density is sufficient to possibly be a containment vessel is selected 404. Alternatively, region 504 may be selected 404 as a possible containment vessel using a characteristic other than density. In the exemplary embodiment, region 504, as detected 402 and selected 404, is illustrated in step 506 of FIG. 5. More specifically, in step 506, a region 504 has been detected 402 and selected 404 in each image A and B.

For each region 504, in the exemplary embodiment, dimensions of region 504 are found 406. More specifically, the dimensions are found 406 by finding maximum and minimum x and y values of region 504 within the image slice. A rectangular pixel map 508 bounded by ($x_{min}$, $y_{min}$) and ($x_{max}$, $y_{max}$) that contains the entire region 504, is created 406. Such a rectangular pixel map 508 is shown in step 510 of FIG. 6. More specifically, in step 510, rectangular pixel map 508 frames each region 504 and includes ($x_{min}$, $y_{min}$) and ($x_{max}$, $y_{max}$) as boundaries. Each of the pixels within pixel map 508 that are contained in region 504 are labeled 408 as "region pixels."

Figure 7A:
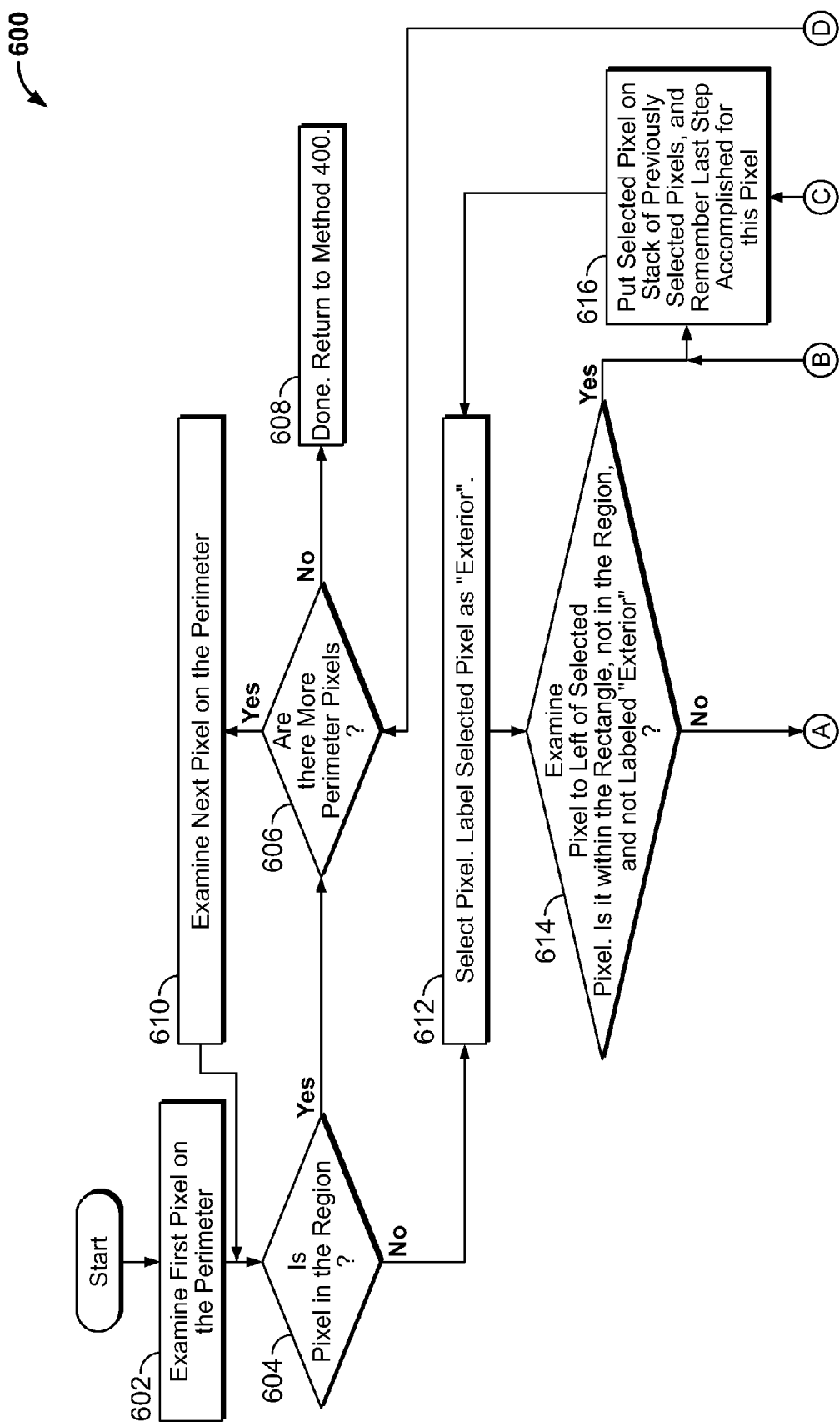

Starting from each pixel on a perimeter 512 of rectangular pixel map 508, all pixels that are contiguous with the pixels on perimeter 512 but not part of region 504 are labeled 410 as "exterior pixels." An exemplary embodiment of a method for labeling 410 the exterior pixels is illustrated in FIGS. 7A and 7B, as described in more detail below. Alternatively, any suitable method can be used to label 410 the exterior pixels. In the exemplary embodiment, images A and B, after labeling 410 of the exterior pixels, are illustrated in step 514 of FIG. 6. More specifically, the pixels within region 504 are "region pixels" and pixels on or between perimeter 512 of rectangular pixel map 508 and region 504 are exterior pixels.

In the exemplary embodiment, after region pixels are labeled 408 and exterior pixels are labeled 410, all pixels within rectangular pixel map 508 that are not already labeled 408 and/or 410 are labeled 412 as "interior pixels." The interior pixels are pixels which are surrounded by region pixels. As shown in step 516 of FIG. 6, images A and B each include a field 518 of interior pixels. In method 400, an area of each field 518 is found 414. More specifically, the total number of interior pixels in each field 518 is found and multiplied by an area of each interior pixel to find 414 the area of an interior pixel field 518. The found area is referred to herein as the "interior area."

In the exemplary embodiment, criteria are predetermined for determining 414 whether an interior area is an area within a containment vessel. More specifically, a value threshold for an interior area is predetermined. The found interior area is compared to the interior area threshold. If the interior area of field 518 is larger than the interior area threshold, region 504 is classified 416 as a "containment region," and the interior area field 518 is classified 416 as a "contained area." In step 520 of FIG. 6, image A includes region 504 that is classified 416 as a containment region 522, and field 518 that is classified 416 as a contained area 502. Method 400 returns 418 to method 200 and region 504 and/or field 518 are analyzed using the special rules because the containment region indicates that a containment vessel is present within image A.

If the interior area of field 518 is equal to and/or smaller than the interior area threshold, region 504 is not a containment region, and the interior area field 518 is not a contained area. In step 520 of FIG. 6, image B includes region 504 that is not a containment region, and field 518 that is not a contained area. Rather, in image B, method 400 returns 418 to method 200 and region 504 and/or field 518 are analyzed using the standard rules because a containment vessel is not present in image B.

FIGS. 7A and 7B are a flowchart of an exemplary embodiment of a method 600 for boundary detection that may be used with method 400 (shown in FIG. 5). Method 600 includes a "boundary identification algorithm." Although method 600 is described herein for boundary detection, it will be understood that any other suitable boundary detection method can be used to determine "exterior" pixels and/or "region" pixels. In the exemplary embodiment, method 600 includes starting from each pixel on a perimeter of a rectangular pixel map, such as perimeter 512 (shown in FIG. 6) of rectangular pixel map 508 (shown in FIG. 6), and labeling all pixels that are contiguous with the pixels on the perimeter, but are not part of an original region, such as region 504 (shown in FIG. 6). The labeled pixels are on the exterior of the region.

More specifically, in the exemplary embodiment, method 600 includes examining 602 a first pixel on perimeter 512 of rectangular pixel map 508. Method 600 determines 604 whether the first pixel is within region 504. If the first pixel is in region 504, method 600 determines 606 whether there are more pixels on perimeter 512. If there are no additional pixels on perimeter 512, method 600 returns 608 to method 400. If there are additional pixels on perimeter 512, the next pixel on perimeter 512 is examined 610 by determining 604 if the next pixel is within region 504.

If the first pixel is determined 604 to not be in region 504, the pixel is selected and labeled 612 as an exterior pixel. A pixel to the left of the selected pixel is examined 614 to determine if the pixel to the left is within map 508, not within region 504, and not labeled 612 as an exterior pixel. If the pixel to the left is within map 508, not within region 504, and not labeled 612 as an exterior pixel, the selected pixel is put 616 on a stack of previously selected pixels, and/or begins a stack of selected pixels. In step 616, for each pixel in the stack, the last step accomplished for the pixel is remembered and/or stored, such as in a computer memory. If the pixel to the left is not within map 508, within region 504, and/or labeled 612 as an exterior pixel, a pixel above the selected pixel is examined 618 to determine if the pixel above is within map 508, not within region 504, and not labeled 612 as an "exterior pixel."

If the pixel above is within map 508, not within region 504, and not labeled 612 as an exterior pixel, the selected pixel is put 616 on a stack of previously selected pixels, and/or begins a stack of selected pixels. In step 616, for each pixel in the stack, the last step accomplished for the pixel is remembered and/or stored, such as in a computer memory. If the pixel above is not within map 508, within region 504, and/or labeled 612 as an exterior pixel, a pixel to the right of the selected pixel is examined 620 to determine if the pixel to the right is within map 508, not within region 504, and not labeled 612 as an exterior pixel.

If the pixel to the right is within map 508, not within region 504, and not labeled 612 as an exterior pixel, the selected pixel is put 616 on a stack of previously selected pixels, and/or begins a stack of selected pixels. If the pixel to the right is not within map 508, within region 504, and/or labeled 612 as an exterior pixel, a pixel below the selected pixel is examined 622 to determine if the pixel below is within map 508, not within region 504, and not labeled 612 as an exterior pixel.

If the pixel below is within map 508, not within region 504, and not labeled 612 as an exterior pixel, the selected pixel is put 616 on a stack of previously selected pixels, and/or begins a stack of selected pixels. If the pixel below is not within map 508, within region 504, and/or labeled 612 as an exterior pixel, method 600 determines 624 if there is a previously selected pixel. If there is not a previously selected pixel, method 600 returns to determining 606 if there are additional pixels on perimeter 512. If there is a previously selected pixel, the previous pixel is removed 626 from the stack of selected pixels, and method 600 returns to the next step for that pixel, based on the last step accomplished for the pixel. Method 600 continues until all pixels not within region 504 and between perimeter 512 and region 504 are labeled 612 as exterior pixels. After all appropriate pixels have been labeled 612 as exterior pixels, method 600 returns 608 to method 400.

Figure 8:
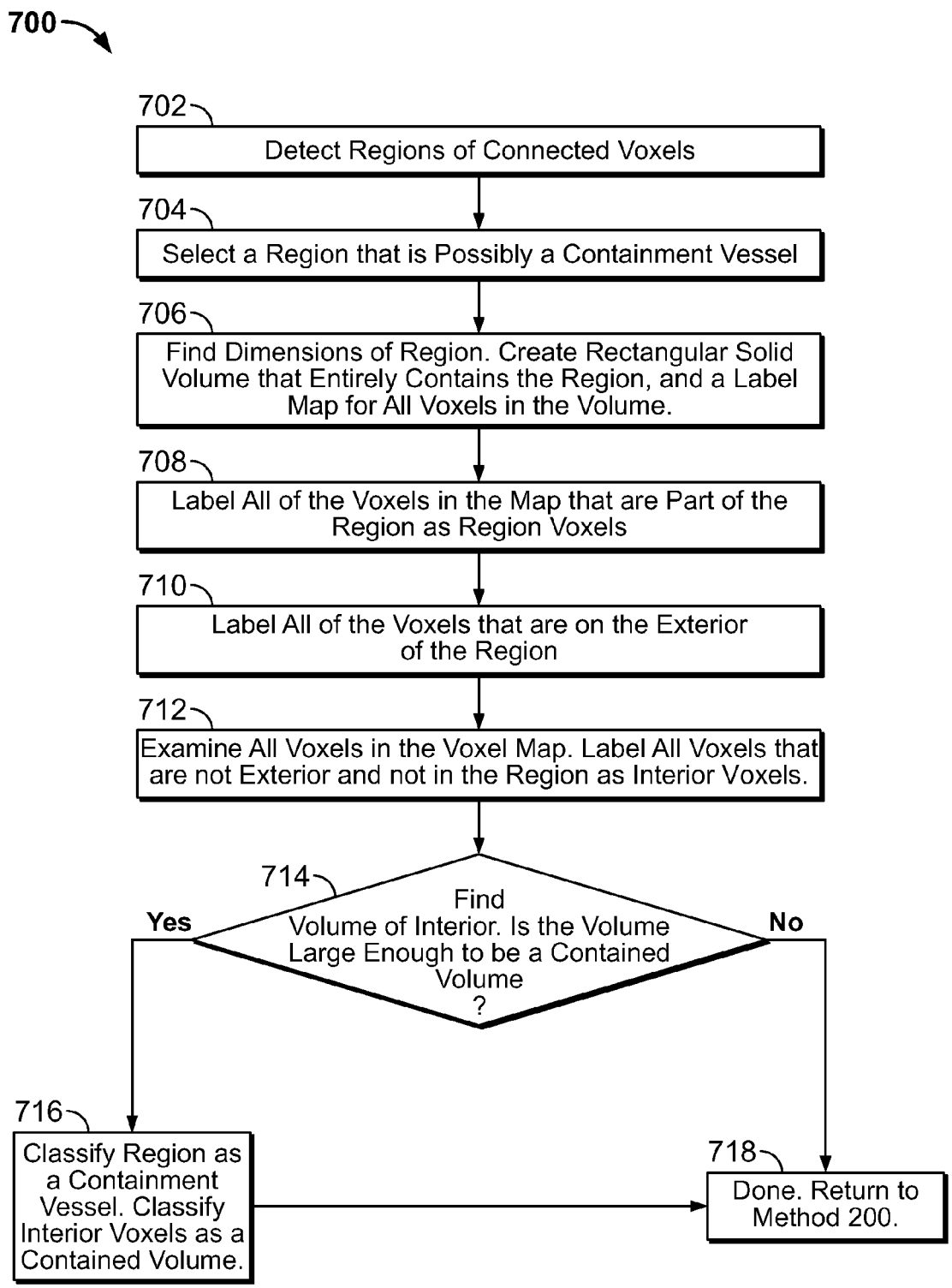

FIG. 8 is a flowchart of an alternative embodiment of a method 700 for detecting a containment vessel that may be used with method 200 (shown in FIGS. 3A and 3B) and/or method 300 (shown in FIG. 4) and the acquired image. Method 700 includes a "detection algorithm." In the exemplary embodiment, a 3D image volume from the acquired image is processed using method 700. As such, method 700 is substantially similar to method 400 (shown in FIG. 5), except voxels are processed in three dimensions, rather than pixels being processed in two dimensions.

More specifically, in the exemplary embodiment, method 700 detects a contained volume in a 3D image slice. Other methods may be used to detect a contained volume, however, method 700 is an exemplary method for detecting a contained volume. Method 700 includes detecting 702 at least one region of connected voxels within the image slice. As used herein, the term "region" refers a set of contiguous voxels that have been determined to be part of one object. The region may be detected 702 by grouping voxels that have, for example, a similar CT value. Each region in which an estimated density is sufficient to possibly be a containment vessel is selected 704. Alternatively, the region may be selected 704 as a possible containment vessel using a characteristic other than density.

For each selected region, in the exemplary embodiment, dimensions of the region are found 406. More specifically, the dimensions are found 706 by finding maximum and minimum x, y, and z values of the region within the image slice. A rectangular solid voxel map bounded by $(x_{min}, y_{min}, z_{min})$ and $(x_{max}, y_{max}, z_{max})$ that contains the entire region, is created 706. More specifically, the voxel map frames the region and includes $(x_{min}, y_{min}, z_{min})$ and $(x_{max}, y_{max}, z_{max})$ as boundaries. Each of the voxels within the voxel map that are contained in the region are labeled 708 as "region voxels."

Starting from each voxel on a perimeter of the rectangular solid voxel map, all voxels that are contiguous with the voxels on the perimeter but not part of the region are labeled 710 as "exterior voxels." An exemplary embodiment of a method for labeling 710 the exterior voxels is shown in FIG. 8 and described in more detail below. Alternatively, any suitable method can be used to label 710 the exterior voxels.

In the exemplary embodiment, after region voxels are labeled 708 and exterior voxels are labeled 710, all voxels within the voxel map that are not already labeled 708 and/or 710 are labeled 712 as "interior voxels." The interior voxels are voxels which are surrounded by region voxels. In method 700, a volume of each field of interior voxels is found 714. More specifically, the total number of interior voxels in each field is found and multiplied by a volume of each interior voxel to find 714 the volume of the interior voxel field. The found volume is referred to herein as the "interior volume."

In the exemplary embodiment, criteria are predetermined for determining 714 whether an interior volume is a volume within a containment vessel. More specifically, a value threshold for an interior volume is predetermined. The found interior volume is compared to the interior volume threshold. If the found interior volume is larger than the interior volume threshold, the region is classified 716 as a "containment region," and the interior volume field is classified 716 as a "contained volume." Method 700 returns 718 to method 200, and the region and/or the field are analyzed and/or classified using the special rules because the containment region indicates that a containment vessel is present within the image slice.

If the found interior volume is equal to or smaller than the interior volume threshold, the region is not a containment region and the interior volume field is not a contained volume. As such, method 700 returns 718 to method 200, and the region and/or the field are analyzed and/or classified using the standard rules because a containment vessel is not present in the image slice.

Figure 9A:
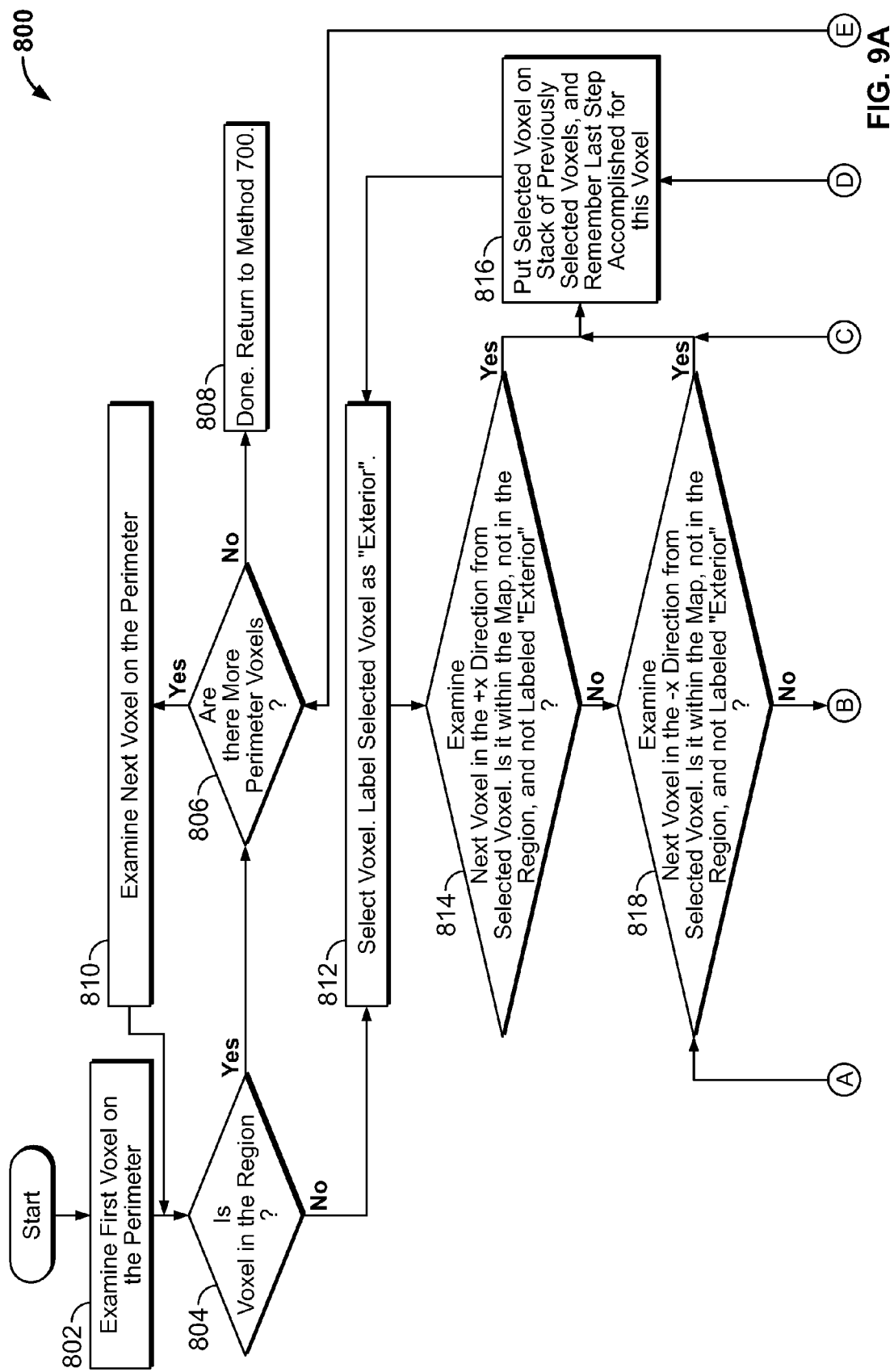

FIGS. 9A and 9B are a flowchart of an exemplary embodiment of a method 800 for boundary detection that may be used with method 700 (shown in FIG. 8). Method 800 includes a "boundary identification algorithm." Although method 800 is described herein, it will be understood that any other suitable boundary detection method can be used to determine "exterior" voxels and/or "region" voxels. Method 800 includes starting from each voxel on a perimeter of the rectangular solid voxel map, and labeling all voxels that are contiguous with the voxels on the perimeter, but are not part of the original region. The labeled voxels are on the exterior of the region.

More specifically, in the exemplary embodiment, method 800 includes examining 802 a first voxel on the perimeter of the voxel map. Method 800 includes determining 804 whether the first voxel is within the region. If the first voxel is in the region, method 800 determines 806 whether there are more voxels on the perimeter. If there are no additional voxels on the perimeter, method 800 returns 808 to method 700. If there are additional voxels on the perimeter, the next voxel on the perimeter is examined 810 by determining 804 if the next voxel is within the region.

If the first voxel is determined 804 to not be in the region, the voxel is selected and labeled 812 as an exterior voxel. A voxel in the +x direction from the selected voxel is examined 814 to determine if the +x voxel is within the voxel map, not within the region, and not labeled 812 as an exterior voxel. If the +x voxel is within the map, not within the region, and not labeled 812 as an exterior voxel, the selected voxel is put 816 on a stack of previously selected voxels, and/or begins a stack of selected voxels. In step 816, for each voxel in the stack, the last step accomplished for the voxel is remembered and/or stored, such as in a computer memory. If the +x voxel is not within the map, within the region, and/or labeled 812 as an exterior voxel, a voxel in the −x direction from the selected voxel is examined 818 to determine if the −x voxel is within the map, not within the region, and not labeled 812 as an exterior voxel.

If the −x voxel is within the map, not within the region, and not labeled 812 as an exterior voxel, the selected voxel is put 816 on a stack of previously selected voxels, and/or begins a stack of selected voxels. In step 816, for each voxel in the stack, the last step accomplished for the voxel is remembered and/or stored. If the −x voxel is not within the map, within the region, and/or labeled 812 as an exterior voxel, a voxel in the +y direction from the selected voxel is examined 820 to determine if the +y voxel is within the map, not within the region, and not labeled 812 as an exterior voxel.

If the +y voxel is within the map, not within the region, and not labeled 812 as an exterior voxel, the selected voxel is put 816 on a stack of previously selected voxels, and/or begins a stack of selected voxels. In step 816, for each voxel in the stack, the last step accomplished for the voxel is remembered and/or stored. If the +y voxel is not within the map, within the region, and/or labeled 812 as an exterior voxel, a voxel in the −y direction from the selected voxel is examined 822 to determine if the −y voxel is within the map, not within the region, and not labeled 812 as an exterior voxel.

If the −y voxel is within the map, not within the region, and not labeled 812 as an exterior voxel, the selected voxel is put 816 on a stack of previously selected voxels, and/or begins a stack of selected voxels. In step 816, for each voxel in the stack, the last step accomplished for the voxel is remembered and/or stored. If the −y voxel is not within the map, within the region, and/or labeled 812 as an exterior voxel, a voxel in the +z direction from the selected voxel is examined 824 to determine if the +z voxel is within the map, not within the region, and not labeled 812 as an exterior voxel.

If the +z voxel is within the map, not within the region, and not labeled 812 as an exterior voxel, the selected voxel is put 816 on a stack of previously selected voxels, and/or begins a stack of selected voxels. In step 816, for each voxel in the stack, the last step accomplished for the voxel is remembered and/or stored. If the +z voxel is not within the map, within the region, and/or labeled 812 as an exterior voxel, a voxel in the −z direction from the selected voxel is examined 826 to determine if the −z voxel is within the map, not within the region, and not labeled 812 as an exterior voxel.

If the −z voxel is within the map, not within the region, and not labeled 812 as an exterior voxel, the selected voxel is put 816 on a stack of previously selected voxels, and/or begins a stack of selected voxels. In step 816, for each voxel in the stack, the last step accomplished for the voxel is remembered and/or stored. If the −z voxel is not within the map, within the region, and/or labeled 812 as an exterior voxel, method 800 determines 828 if there is a previously selected voxel. If there is not a previously selected voxel, method 800 returns to determining 806 if there are additional voxels on the perimeter. If there is a previously selected voxel, the previous voxel is removed 830 from the stack of selected voxels and method 800 returns to the next step for that voxel, based on the last step accomplished for the voxel. Method 800 continues until all voxels not within the region and between the region and the perimeter are labeled 812 as exterior voxels. After all appropriate voxels have been labeled 812 as exterior voxels, method 800 returns 808 to method 700.

The above-described methods and system for detecting a containment vessel and/or identifying contraband within a container facilitate reducing false alarm rates, as compared to methods and/or systems that apply one set of rules to all objects identified within a container. More specifically, by applying a first set of rules generally and a second set of rules, different from the first set of rules, to a containment vessel, the embodiments described herein more accurately identify contraband, either as the containment vessel or in the containment vessel. Further, by more accurately identifying the material within a containment vessel, the embodiments described herein facilitate reducing a false negative rate, as compared to methods and/or systems that apply one set of rules.

Exemplary embodiments of methods and a system are described above in detail. The methods and system are not limited to the specific embodiments described herein but, rather, components of the system and/or steps of the methods may be utilized independently and separately from other components and/or steps described herein. For example, the methods may also be used in combination with other imaging and/or detection systems and methods, and are not limited to practice with only the imaging system and/or detection system and methods as described herein. Rather, the exemplary embodiment can be implemented and utilized in connection with many other image analysis applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for identifying an object in an acquired image, said method comprising:
   detecting an object within the acquired image;
   detecting a low-density material within the acquired image;
   determining whether the detected object is a containment vessel;
   determining whether the low-density material is within the containment vessel;
   applying a first set of rules for classifying the object if the object is not the containment vessel using a first CT number threshold; and
   applying a second set of rules for classifying the object if the object is the containment vessel.

2. A method in accordance with claim 1, further comprising:
   applying the first set of rules to classify the low-density material if the low-density material is not within the containment vessel; and
   applying the second set of rules to classify the low-density material if the low-density material is within the containment vessel.

3. A method in accordance with claim 1, further comprising determining whether a material of the object is one of a dense material and a non-dense material.

4. A method in accordance with claim 3, further comprising:
   when the material is the non-dense material, determining whether the non-dense material is contraband; and
   when the material is the dense material, adjusting a threshold in the first set of rules to account for an effect of the containment vessel on the acquired image.

5. A method in accordance with claim 4, wherein adjusting a threshold further comprises raising a CT number threshold of the first set of rules to account for higher computed tomography numbers within the containment vessel.

6. A method in accordance with claim 1, wherein determining whether the detected object is a containment vessel further comprises:
   detecting a region of connected pixels;
   labeling each pixel within the detected region as one of a region pixel, an exterior pixel, and an interior pixel; and
   determining whether a field of interior pixels is a contained area.

7. A method in accordance with claim 6, when the field of interior pixels is determined to be the contained area, said method further comprising:
   determining an area of the field of interior pixels;
   comparing the determined area to a threshold area; and
   when the determined area is at least equal to the threshold area:
      labeling the field of interior pixels as the contained area; and
      labeling a field of region pixels as the containment vessel.

8. A method in accordance with claim 1, wherein determining whether the detected object is a containment vessel further comprises:
  detecting a region of connected voxels;
  labeling each voxel within the detected region as one of a region voxel, an exterior voxel, and an interior voxel; and
  determining whether a field of interior voxels is a contained volume.

9. A method in accordance with claim 8, when the field of interior voxels is determined to be the contained volume, said method further comprising:
  determining a volume of the field of interior voxels;
  comparing the determined volume to a threshold volume; and
  when the determined volume is at least equal to the threshold volume:
    labeling the field of interior voxels as the contained volume; and
    labeling a field of region voxels as the containment vessel.

10. A system for identifying an object, said system comprising:
  a radiation source;
  a detector for detecting radiation generated by said radiation source; and
  a control system coupled in communication with said radiation source and said detector, said control system configured to:
    acquire an image:
    detect an object within the acquired image;
    detect a low-density material within the acquired image;
    determine whether the detected object is a containment vessel;
    determine whether the low-density material is within the containment vessel;
    apply a first set of rules for classifying the object if the object is not the containment vessel using a first CT number threshold;
    apply a second set of rules for classifying the object if the object is the containment vessel; and
    output information relating to the object.

11. A system in accordance with claim 10, wherein said control system is further configured to:
  apply the first set of rules to classify the low-density material when the low-density material is not within the containment vessel; and
  apply the second set of rules to classify the low-density material when the low-density material is within the containment vessel.

12. A system in accordance with claim 10, wherein said control system is further configured to:
  determine whether a material from which the containment vessel is formed is one of a dense material and a non-dense material;
  when the material is the non-dense material, determine whether the non-dense material is contraband; and
  when the material is the dense material, adjust a threshold in the first set of rules to account for an effect of the containment vessel on the acquired image by raising a CT number threshold of the first set of rules to account for higher computed tomography numbers within the containment vessel.

13. A system in accordance with claim 10, wherein said control system is further configured to:
  detect a region of connected pixels;
  label each pixel within the detected region as one of a region pixel, an exterior pixel, and an interior pixel;
  determine an area of the field of interior pixels;
  compare the determined area to a threshold area; and
  when the determined area is at least equal to the threshold area:
    label the field of interior pixels as a contained area; and
    label a field of region pixels as the containment vessel.

14. A system in accordance with claim 10, wherein said control system is further configured to:
  detect a region of connected voxels;
  label each voxel within the detected region as one of a region voxel, an exterior voxel, and an interior voxel;
  determine a volume of a field of interior voxels;
  compare the determined volume to a threshold volume; and
  when the determined volume is at least equal to the threshold volume:
    label the field of interior voxels as a contained volume; and
    label a field of region voxels as the containment vessel.

15. A computer program embodied on a computer-readable medium, said computer program comprising a code segment that configures a processor to:
  detect an object within an acquired image;
  detect a low-density material within the acquired image;
  determine whether the detected object is a containment vessel;
  determine whether the low-density material is within the containment vessel;
  apply a first set of rules for classifying the object if the object is not the containment vessel using a first CT number threshold;
  apply a second set of rules for classifying the object if the object is the containment vessel; and
  output information relating to the object.

16. A computer program in accordance with claim 15, wherein the code segment further configures the processor to:
  apply the first set of rules to classify the low-density material when the low-density material is not within the containment vessel; and
  apply the second set of rules to classify the low-density material when the low-density material is within the containment vessel.

17. A computer program in accordance with claim 15, wherein the code segment further configures the processor to:
  determine whether a material from which the containment vessel is formed is one of a dense material and a non-dense material;
  when the material is the non-dense material, determine whether the non-dense material is contraband; and
  when the material is the dense material, adjust a threshold in the first set of rules to account for an effect of the containment vessel on the acquired image by raising a CT number threshold of the first set of rules to account for higher computed tomography numbers within the containment vessel.

18. A computer program in accordance with claim 15, wherein the code segment further configures the processor to:
  detect a region of connected image elements;
  label each image element within the detected region as one of a region image element, an exterior image element, and an interior image element;
  determine a quantity of a field of interior image elements;
  compare the determined quantity to a threshold quantity; and
  when the determined quantity is at least equal to the threshold quantity:
    label the field of interior image elements as a contained quantity; and
    label a field of region image elements as the containment vessel.

* * * * *